Patented Nov. 7, 1939

2,179,092

UNITED STATES PATENT OFFICE 2,179,092

MANUFACTURE OF ETHERS

Vladimir Ipatieff, Chicago, Ill., assignor to Universal Oil Products Company, Chicago, Ill., a corporation of Delaware No Drawing. Application October 26, 1932, Serial No. 639,614

9 Claims. (Cl. 260—614)

This invention relates to the manufacture of ethers, and refers more particularly to the manufacture of ordinary ethyl ether which may be used for anesthetic or other purposes though other similar compounds may be prepared by the process.

In a more specific sense the invention is concerned with the production of ethers from olefin hydrocarbons by a process which is essentially a one stage operation and which may be operated over long periods of time without interruption in contrast to the older and more generally used methods of their preparation from alcohol by decomposition in the presence of sulfuric acid as a catalyst. The invention possesses further advantages in the cheapness of the raw materials which may be employed and in the purity of the product as will be brought out in developing the details of the process.

In the ordinary methods for the manufacture of ethyl ether sulfuric acid and alcohol are heated together in retorts at a temperature of 130–140° C. at ordinary or at most only slightly superatmospheric pressures, more alcohol being continuously added as it is converted into ether. The chemical reactions involved in this method of manufacture may be expressed generally by the equations:

1. $C_2H_5OH + H_2SO_4 = C_2H_5HSO_4 + H_2O$
   Alcohol   Sulfuric   Ethyl sulacid     furic acid 2. $C_2H_5HSO_4 + C_2H_5OH = (C_2H_5)_2O + H_2SO_4$
   Ether If the course of the reactions followed the above equations exactly, sulfuric acid would be continuously regenerated and would act in all respects as a catalyst, the mono-ethyl sulfate formed being an intermediate compound representing the first step in the manufacture of the ether. However, numerous side reactions occur in this process which result in reduction of the acid to sulfur dioxide and there is also the concurrent formation of aldehydes, methyl compounds, ketones and vinyl alcohol. Owing to the formation of these by-products, ether thus produced must be rectified and treated with various chemical reagents to remove the impurities, particularly when the ether is to be used as an anesthetic, to avoid pathological effects.

As an alternative mode of procedure it has been proposed to start with ethylene and first form the mono-ethyl sulfuric acid which is then hydrolyzed in a second step to form ether. However, in the second step of this process two types of reactions tend to occur, one leading to the formation of the desired ether and the other to the formation of alcohol depending upon the relative amounts of mono-ethyl sulfate and water which are reacting according to the following equations:

1. $2(C_2H_5HSO_4) + H_2O = (C_2H_5)_2O + H_2SO_4$
   Ethyl sulfuric              Ether 2. $C_2H_5HSO_4 + H_2O = C_2H_5OH + H_2SO_4$
                              Alcohol In this process, therefore, there is a considerable tendency toward the formation of alcohol as an undesirable by-product when the production of ether is the aim of the operations.

In one specific embodiment the present invention comprises a process for manufacturing ethers by contacting olefins with dilute aqueous solutions of acids and/or salts at temperatures of the order of from 130 to 300° C. and pressures of the order of 200 to 400 atmospheres.

As examples of acids which may be employed in concentrations from approximately 10 to 70% the following may be mentioned:

Sulfuric acid ($H_2SO_4$)
Selenic acid ($H_2SeO_4$)
Hydrochloric acid (HCl)
Phosphoric acid ($H_3PO_4$)
Perchloric acid ($HClO_4$)

and others. The salts which may be employed in aqueous solution and in approximately the same concentrations are those which have polymerizing and condensing action as ordinarily used in the anhydrous condition or in concentrated solutions, examples of such salts being zinc chloride, aluminum chloride, et cetera. It is pointed out that the various materials mentioned are not necessarily equivalents, but that the selection of one or any combination would depend on the results desired. The salts may be employed in admixture with the acids, for example, a dilute solution of hydrochloric acid containing zinc chloride may be used.

I have determined that when olefins such as ethylene and its homologs are contacted with these relatively dilute solutions of acids and salts at elevated temperatures and pressures, that a direct hydrolysis of the original olefins occurs to form corresponding ethers with a minimum of undesirable by-products, the equation representing the reaction being expressed as follows:

$$2C_2H_4 + H_2O = (C_2H_5)_2O$$

Thus, for uniformity of operation, the principal requirement is the maintenance of a proper supply of steam or water to take care of the requirements of the reaction and also to make up for any loss from the catalytic solution by vaporization.

Operating under these conditions and using the dilute solutions there is substantially no polymerization of olefins even under the very high pressures which are preferably employed for effecting the reactions at commercial rates. The particular temperature and pressure employed will be varied with the type and strength of solution which it may be found expedient to use for any reason, so that the optimum temperature ranges for the different reagents enumerated can only be given approximately. However, it may be stated that for acids such as sulfuric and perchloric acids the allowable maximum temperature is usually within the range of 200 to 230° C. When higher temperatures are employed using these acids there is an increased tendency for the formation of high molecular weight polymers or tars. When using hydrochloric acid, phosphoric acid, zinc chloride and aluminum chloride higher temperatures are permissible.

In conducting operations according to the process of the invention several alternatives, though not necessarily equivalents, are possible and are comprised within the scope of the invention. As a batch operation a suitable pressure vessel, such as a bomb or autoclave may be charged with approximately one-fourth to one-third of its volume of a selected acid or saline solution and ethylene gas may be pumped in cold until a high pressure is obtained. The admission of gas is then stopped and the pressure vessel heated to a point corresponding to the desired rate of reaction. As the pressure drops corresponding to the formation of ether, more ethylene may be introduced and the cycle repeated. If pumps are available for continuously maintaining the high pressures, the ethylene may be introduced continuously while maintaining pressure and temperature conditions constant. The ether produced may be allowed to accumulate on the surface of the aqueous layer and drawn off as a liquid at intervals or it may be drawn off continuously as a vapor. In case the vapors thus drawn off contain any substantial amounts of unchanged ethylene they may be recycled to the pressure treater again after separation of ether vapors.

It is possible to employ commercial hydrocarbon gas mixtures such as gases from oil cracking operations containing high percentages of olefins in place of pure olefins such as ethylene or propylene with suitable modifications of conditions of operation on account of the decreased partial pressure of the reacting hydrocarbons. It is usually preferable to purify gas mixtures containing olefins such as might be obtained from oil cracking processes by preliminary removal of hydrogen sulfide and other sulfur compounds which might corrode the equipment or cause the production of sulfur derivatives which would contaminate the product. Hydrocarbon mixtures containing olefins may be fractionated by low temperature fractionation or by any process capable of effecting the approximate separation of the gas mixture into fractions corresponding to certain olefins. For example, a mixture of gases produced from an oil cracking process may be subjected to fractionation to separate and eliminate such fixed gases as hydrogen, hydrogen sulfide, nitrogen, oxygen, carbon monoxide, carbon dioxide, methane, et cetera, and the remaining heavier hydrocarbons may be split up into fractions corresponding to ethylene, propylene, butylene, and amylene, which can then be separately employed for the manufacture of their corresponding ethers by the process of the invention.

As an example of the novel results obtained by the use of the process the manufacture of ethyl ether from ethylene will be given. Ethylene was charged into a pressure vessel containing a 40% aqueous solution of sulfuric acid, and then heated at a temperature of 200° C. and a pressure of 200 atmospheres, the pressure dropping gradually as the ether was formed. This process was repeated a number of times without removal of the ether, until the rate of pressure drop was very slow, when the bomb was cooled down and the ether removed. In this way 95% of the ethylene introduced was converted into ethyl ether. In later operations the ethylene was pumped in continuously to maintain the pressure at 200 atmospheres until the ether which was formed practically filled the vessel.

The novel character and utility of the invention and its advantages over existing processes is evident from the preceding specification and the example but neither specification nor example is to be considered as imposing undue restrictions upon the scope of the invention.

I claim as my invention:

1. A process for the production of ethers, which comprises contacting an olefin with a dilute solution of zinc chloride at temperatures within the range of 130° to 300° C., and pressures of about 200 to 400 atmospheres, and recovering the non-aqueous product of the process.

2. A process for the production of ether, which comprises contacting an olefin with a dilute solution of mineral acid containing a polymerizing metal halide at temperatures within the range of 130° to 300° C., and pressures of about 200 to 400 atmospheres, and recovering the non-aqueous product of the process.

3. A process for producing ethers, which comprises subjecting an olefin to the action of a dilute solution of mineral acid containing a polymerizing metal halide at elevated temperature of at least 130° C. and superatmospheric pressure of at least 200 atmospheres, and recovering the non-aqueous product of the process.

4. A process for the production of ether, which comprises contacting an olefin with a dilute solution of sulphuric acid containing a polymerizing metal halide at temperatures within the range of 130° to 300° C., and pressures of about 200 to 400 atmospheres, and recovering the non-aqueous product of the process.

5. A process for the production of ether, which comprises contacting an olefin with a dilute solution of mineral acid containing zinc chloride at temperatures within the range of 130 to 300° C., and pressures of about 200 to 400 atmospheres, and recovering the non-aqueous product of the process.

6. A process for the production of ether, which comprises contacting an olefin with a dilute solution of hydrochloric acid containing zinc chloride at temperatures within the range of 130° to 300° C., and pressures of about 200 to 400 atmospheres, and recovering the non-aqueous product of the process.

7. In the production of ethers by hydration of olefins, the improvement which comprises reacting the olefin with water in the presence of a mixture of a mineral acid and a polymerizing metal halide at a temperature of from 130 to 300° C. and under a pressure of about 200 to 400 atmospheres.

8. The process which comprises hydrating olefines in contact with a dilute aqueous inorganic acid hydration catalyst at a temperature of about 300° C. and a pressure in excess of 300 atmospheres.

9. The process which comprises hydrating olefines in contact with a dilute aqueous hydration catalyst at a pressure in excess of 300 atmospheres.

VLADIMIR IPATIEFF.